(12) United States Patent
Adachi

(10) Patent No.: US 6,590,871 B1
(45) Date of Patent: Jul. 8, 2003

(54) MULTI-CARRIER MODULATION APPARATUS AND TRANSMITTER USING THE SAME

(75) Inventor: Masaru Adachi, Kodaira (JP)

(73) Assignee: Hitachi Denshi Kabushiki Kaisha, Tokyo (JP)

(*) Notice: Subject to any disclaimer, the term of this patent is extended or adjusted under 35 U.S.C. 154(b) by 0 days.

(21) Appl. No.: 09/339,906

(22) Filed: Jun. 25, 1999

(30) Foreign Application Priority Data

Jun. 26, 1998 (JP) .......................................... 10-180540

(51) Int. Cl.[7] .............................. H04J 4/00; H04J 1/00; H04B 7/208; H04B 7/212

(52) U.S. Cl. ....................... 370/307; 370/343; 370/344; 370/347; 370/481

(58) Field of Search ................................ 370/307, 347, 370/344, 319, 320, 337, 338, 442, 480, 481, 343

(56) References Cited

U.S. PATENT DOCUMENTS

| | | | | |
|---|---|---|---|---|
| 4,237,551 A | * | 12/1980 | Narasimha | 370/50 |
| 4,304,000 A | * | 12/1981 | Bonnerot et al. | 370/70 |
| 5,299,192 A | * | 3/1994 | Guo et al. | 370/70 |
| 5,473,280 A | | 12/1995 | Ohnishi et al. | |
| 5,590,156 A | * | 12/1996 | Carney | 375/316 |
| 5,870,668 A | * | 2/1999 | Takano et al. | 455/126 |
| 5,889,766 A | * | 3/1999 | Ohnishi | 370/307 |
| 6,134,268 A | * | 10/2000 | McCoy | 375/229 |

OTHER PUBLICATIONS

Koilpillai et al.; IEEE Transaction on Signal Processing, vol. 39, No. 10, pp. 2174–2183; Oct. 1991.*
Corden et al., IEE Processings, vol. 137, pt. I, No. 6, pp. 408–416; Dec. 1990.*
Neurohr et al., Signal Processing Proceedings, 1998. ICSP '98. 1998 Fourth Inter., . . . , pp. 35–38, vol. 1.*
JP–A–1–117437 (Abstract only).
IEEE Trans–on Communications, vol. COM–22, No. 9, Sep. 1974.

* cited by examiner

*Primary Examiner*—Edward F. Urban
*Assistant Examiner*—Meless Zewdu
(74) *Attorney, Agent, or Firm*—Antonelli, Terry, Stout & Kraus, LLP

(57) ABSTRACT

A multi-carrier modulation apparatus to which transmultiplexers are applied. A multiplexing signal is treated as a synthesis of a plurality of multiplexed signals which are separated by a wider interval than the multiplexing frequency interval. Signals of channels 1 to M continuously frequency-multiplexed at a channel interval $f_B$ are treated as a synthetic signal of signals of channel 1 to channel 2N–1 and signals of channel 1 to channel 2N which are frequency-multiplexed at a channel interval $2f_B$. Individual multiplexed signals are synthesized by a plurality of transmultiplexers of less multiplexing number to make characteristics of polyphase filters required for the transmultiplexers less sharp.

8 Claims, 8 Drawing Sheets

$\Phi = \pi(M-1)/M$

CHANNEL INTERVAL > SIGNAL BAND WIDTH

CHANNEL INTERVAL CLOSE TO SIGNAL BAND WIDTH

MULTI-CARRIER MODULATION APPARATUS AND TRANSMITTER USING THE SAME

BACKGROUND OF THE INVENTION

The present invention relates to a multi-carrier modulation apparatus and more particularly, to a transmitter for use in mobile communication.

A transmultiplexer (TMUX) is available as an apparatus which can process a multiplex signal in its multiplexed state, that is, without performing an operation of lowering the sampling frequency to restore the multiplex signal to individual signals. The TMUX is an apparatus adapted to carry out mutual conversion between a time-division-multiplex (TDM) signal and a frequency-division-multiplex (FDM) signal. By applying the TMUX, a plurality of filter banks having the same pass-band characteristic but having different center frequencies can be constructed to permit a collective processing of a plurality of filtering and modulation operations of the multi-carrier modulation apparatus.

TMUX is detailed in, for example, "Modulation Form Conversion Apparatus" in JP-A-1-117437 and "TDM-FDM Transmultiplexer: Digital Polyphase and FFT" by Maurice G. Bellanger et al, IEEE Trans. on Communications, vol. COM-22, No. 9, September 1974. It is also described in "Applications of Digital Signal Processing" edited by The Institute of Electronic Information and Communication Engineers of Japan, page 126, FIG. 5.27, May 20, 1981.

At first, a prior art multi-carrier modulation method utilizing a TMUX will be described below.

A TMUX and filter bank will first be outlined with reference to FIGS. 3 and 4.

FIG. 3 is a spectrum diagram for explaining the operation principle of the TMUX and filter bank along signal processing steps, where abscissa represents frequency and ordinate represents signal level. In the figure, $f_S$ designates a sampling frequency of polyphase filters $43_0$ to $43_{M-1}$, $f_K$ designates a shift frequency, $f_B$ designates a pass-bandwidth, k−1 designates a spectrum of (k−1)-th filter, k designates a spectrum of k-th filter and k+1 designates a spectrum of (k+1)-th filter where k is an integer as defined by $M \geq k \geq 1$.

FIG. 4 is a block diagram showing an example of the construction of the TMUX for realization of TDM-FDM conversion similar to that in the TDM-FDM converter explained in the aforementioned IEEE Trans. or illustrated in FIG. 5.27 of the aforementioned "Applications of Digital Signal Processing". The TMUX has a TDM input 40, a demultiplexing switch 41, an M-point inverse discrete Fourier transform (IDFT) unit 42, polyphase filters $43_0$ to $43_{M-1}$, phase shifters $44_0$ to $44_{M-1}$, delay circuits $45_0$ to $45_{M-1}$, an adder 46 and a FDM output terminal 47. Here, suffixes 0 to M−1 of the reference numerals mean that there are M constituent components of 0-th to (M−1)-th components. The TDM input terminal 40 is connected to the demultiplexing switch 41 which in turn is connected to the respective input terminals of the M-point IDFT unit 42. Output terminals of the M-point IDFT unit 42 are connected to the polyphase filters $43_0$ to $43_{M-1}$, respectively. Especially, the polyphase filter $43_0$ is called an original filter. The polyphase filters $43_0$ to $43_{M-1}$ are connected to the delay circuits $45_0$ to $45_{M-1}$, respectively, through the corresponding phase shifters $44_0$ to $44_{M-1}$ and the respective delay circuits $45_0$ to $45_{M-1}$ are connected to the adder 46 which in turn is connected to the FDM output terminal.

In FIGS. 3 and 4, it is presupposed that all signals are complex signals in order to handle quadrature modulation waves. A frequency shift $f_K$ for conversion of the TDM signal into the FDM signal is so selected as to satisfy such a condition that the sampling frequency $f_S$ of the polyphase filters is related to the shift frequency $f_K$ of each channel in a relation of $f_k=(k+1/2) f_s/M$ (see (a) in FIG. 3). When a TDM signal inputted to the TDM input terminal 40 is demultiplexed by the demuliplexing switch circuit 41, the sampling frequency $f_S$ is reduced to $f_S/M$ so as to take a spectrum form as shown at solid line at (b) in FIG. 3. The signal having this spectrum is again sampled at the aforementioned sampling frequency $f_S$ with the result that aliasing components as shown at dotted line at (b) in FIG. 3 develop. By extracting components of a necessary frequency band from those components by means of the filter bank, the conversion can be completed.

The filter bank is constructed of a group of band-pass filters having the same pass-band width $f_B$ and having center frequencies which are separated by $f_B$ from each other. Accordingly, as shown at (c) in FIG. 3, the k-th filter $H_k(Z)$ is obtained by frequency-shifting the original filter $H_0(Z)$ having the same frequency characteristic by $(k+1/2)f_B$ and is equal to substitution of equation (1) in which f of delay operator $Z=\exp(j2\pi f/f_S)$ in the original filter $H_0(Z)$ is replaced with $f-(k+1/2)f_B$.

$$\exp(j2\pi(f - kf_B - f_B/2)f_s) = z\exp(-j2\pi(k + 1/2)f_B/f_s) \quad (1)$$
$$= z\exp(-j2\pi(k + 1/2)/M)$$
$$= zW^k\exp(-j\pi/M)$$

where, $W=\exp(-j2\pi/M)$

Namely, $H_k(Z)$ is given by equation (2), $$H_k(z)=H_0(zW^k \exp(-j\pi/M)) \quad (2)$$

Incidentally, an arbitrary filter can be expressed by a polyphase filter in which the sampling frequency is set to 1/M, as indicated by equation (3)

$$H(z)=\Sigma H(z^M)_i z^{-i} \quad (3)$$

Thus, by decomposing the k-th filter $43_K$ into polyphase and applying $kf_B$ frequency shift, equation (3) can be reduced to $$H_z(z) = \sum H_k(z^M)_i z^{-i} \quad (4)$$
$$= \sum H_0(-z^M)_i z^{-i} W_{-ik} \exp(j\pi i/M)$$

where $$W_{-ik}=(W)^{-ik}=\exp(j2\pi ik/M) \quad (5)$$

By adding all of M outputs from respective k-th filters $43_k$, the FDM signal can be obtained.

As will be seen from equation (4), the filter bank of FDM scheme can be realized by the multiplication of matrix $W_{-ik}$ pursuant to equation (5) (the M-point IDFT unit 42 of FIG. 4), the M polyphase filters $43_0$ to $43_{M-1}$ pursuant to equation (3), the phase rotation $\exp(j\pi i/M)$ by means of the M phase shifters $44_0$ to $44_{M-1}$ of FIG. 4 and the delay z by means of the M delay circuits $45_0$ to $45_{M-1}$ of FIG. 4. The multiplication of matrix $W_{ik}$ is the butterfly operation used in the fast Fourier transform (FFT) and therefore its speedup can be achieved by the same algorithm. Since the M polyphase filters $43_0$ to $43_{M-1}$ which are respectively developed from the M filter banks are all common to each other, the hardware and software process can be reduced in scale. In this manner, the TDM-FDM conversion can be realized with the TMUX.

SUMMARY OF THE INVENTION

An example of the multi-carrier modulation method applied with the TMUX which is employed to convert four complex base-band input signals into a FDM signal will be described with reference to FIGS. 5 and 6. It is to be noted that this modulation method is contrived by the present inventors in the course of achieving the present invention.

FIG. 6 is a spectrum diagram for explaining the operation procedure of multi-carrier modulation of 4-channel multiplexing (CH1, CH2, CH3 and CH4), in which a TMUX having a 8-point IDFT is used. In the figure, abscissa represents frequency, ordinate represents signal level, $f_S$ represents sampling frequency for signal processing, $f_{sym}$ represents sampling frequency for input complex base-band signal, and $f_B$ represents filter pass-band width. Note that the scale of the abscissas shown in FIG. 6 is not drawn to coincide with that of FIG. 3 due to drafting, although $f_s$ is the same between these figures. FIG. 5 is a block diagram showing the construction of a multi-carrier modulation apparatus for performing the 4-channel multiplexing multi-carrier modulation by using the 8-point input TMUX.

The apparatus has a CH1 complex base-band signal input terminal 50-1, a CH2 complex base-band signal input terminal 50-2, a CH3 complex base-band signal input terminal 50-3, a CH4 complex base band signal input terminal 50-4, a CH1 interpolation filter 51-1, a CH2 interpolation filter 51-2, a CH3 interpolation filter 51-3, a CH4 interpolation filter 51-4, a CH1 frequency shifter 52-1, a CH2 frequency shifter 52-2, a CH3 frequency shifter 52-3, a CH4 frequency shifter 52-4, a CH1 zero in terpolator 53-1, a CH2 zero interpolator 53-2, a CH3 zero interpolator 53-3, a CH4 zero interpolator 53-4, an 8-point IDFT unit 54, a polyphase filter 55, a phase shift/delay circuit 56, an adder 57, and an output terminal 59. The 8-point IDFT unit 54, polyphase filter 55, phase shift/delay circuit 56 and adder 57 constitute a TMUX unit 58.

The input terminal 50-1 for channel 1 (CH1) is connected to the interpolation filter 51-1 which in turn is connected to the frequency shifter 52-1. The frequency shifter 52-1 is connected to the zero interpolator 53-1 which in turn is connected to the 8-point IDFT unit 54. Similarly, in other channels CH2, CH3 and CH4, the input terminals 50-2, 50-3 and 50-4 lead up to the zero interpolators 53-2, 53-3 and 53-4, respectively, through the interpolation filters 51-2, 51-3 and 51-4 as well as the frequency shifters 52-2, 52-3 and 52-4 so as to be connected to the 8-point IDFT unit 54. In the frequency shifter, the interpolation filter output signal is caused to undergo frequency shift to a frequency position extracted by the transmultiplxer. Respective output terminals of the 8-point IDFT unit 54 are connected to the polyphase filter 55 and respective output terminals of the polyphase filter 55 are connected to the phase shift/delay circuit 56. Respective output terminals of the phase shift/delay circuit 56 are connected to the adder 57 which in turn is connected to the output terminal 59. The remaining input terminals of the 8-point IDFT unit 54 are applied with "0" level. A signal obtained from the TMUX 58 is connected to a D/A converter 1 having its output terminal connected to a low-pass filter (LPF) 2. An output terminal of the LPF 2 is connected to a radio-frequency processor 3 having its output terminal connected to an antenna 4.

In order to permit the high-speed processing in FIGS. 5 and 6, the number of input points (channels) N of the IDFT unit of the TMUX must be a power of 2. On the other hand, the larger the input point number N, the greater the amount of necessary processing becomes. Therefore the input point number N must be suppressed to a necessary minimum. In addition, idle channels in which signals are not multiplexed must be provided. Therefore, the input point number N may preferably be 8 for 4-channel multiplexing (N=8=$2^3$). It will be appreciated that N=4=$2^2$ is insufficient because the aforementioned idle channels cannot be provided.

Generally, the sampling frequency $f_{sym}$ of the input complex base-band signal is an integer multiple of the symbol frequency, thus differing from the sampling frequency for performing the TMUX processing which is an integer multiple of a frequency interval of multi-carrier waves. Accordingly, the sampling frequency of the complex base-band signal is required to be converted into 1/k (k: integer) of the sampling frequency of the TMUX by using the interpolation filter. To this end, the complex base-band signals of respective channels are inputted to the interpolation filters 51-1, 51-2, 51-3 and 51-4, respectively, through the input terminals 50-1, 50-2, 50-3 and 50-4 so that the sampling frequency of the complex base-band signals may be converted into a TMUX sampling frequency sequence. For example, time-variant coefficient filters described in U.S. Pat. No. 5,473,280 may be used as the interpolation filters 51-1, 51-2, 51-3 and 51-4, the disclosure of which is hereby incorporated by reference.

Through the above process, the input complex base-band signals shown at (a) in FIG. 6 are converted from a input complex base-band sampling frequency sequence ($f_{sym}$) shown at (a) in FIG. 6 into a frequency $f_S$ of the TMUX processing system as shown at (b) in FIG. 6. Subsequently, in the frequency shifters 52-1, 52-2, 52-3 and 52-4, the frequency is shifted by +$f_S$/16. The thus +$f_S$/16 frequency-shifted signals are each converted into a processing sequence of sampling frequency $f_S$ by means of the zero interpolators 53-1, 53-2, 53-3 and 53-4. To describe this process more specifically with reference to FIG. 7, outputs of the preceding stages of phase shifters 52-1, 52-2, 52-3 and 52-4 are delivered only at a period of frequency $f_S$/8 and "0"s are delivered at the remaining 7 points. Through the above operation, a higher harmonic component is generated every $f_S$/8 frequency as shown at (d) in FIG. 6. These signals are inputted to the aforementioned TMUX so as to be converted into a FDM signal as shown at (f) in FIG. 6. There is shown at (e) in FIG. 6 a filter characteristic obtained when the original filter is shifted to a frequency position corresponding to the fourth channel in order to derive the fourth channel signal. With this filter, the fourth channel signal can be extracted. The output of the TMUX is inputted to the D/A converter 1 so as to be converted into an analog signal which is then subjected to removal of an unwanted component such as sampling noise by means of the LPF 2, followed by frequency conversion and power amplification by means of the radio-frequency unit 3 so as to be output as a transmission signal from the antenna 4. The radio frequency unit 3 manages signals of a high frequency including a radio frequency. In FIG. 7, abscissa represents time and ordinate represents amplitude level of signal.

Thus, equations (1), (2) and (4) are respectively reduced to $$\exp(j2\pi(f - kf_B - f_B/2)f_s) = z\exp(-j2\pi(k+1/2)f_B/f_s) \quad (6)$$

$$= z\exp(-j2\pi(k+1/2)/8)$$

$$= zW^k \exp(-j\pi/8)$$

where, W=exp(-j2π/8)

$$H_k(z) = H_0(zW^k \exp(-j\pi/8)) \quad (7)$$

$$H_k(z) = \sum_{i=0}^{7} H_k(z^8)_i z^{-i} \quad (8)$$

$$= \sum_{i=0}^{7} H_0(-z^8)_i z^{-i} W_{-ik} \exp(j\pi i/8)$$

where, $W_{-ik}=(W)^{-ik}=\exp(j2\pi ik/8)$

In case of mobile communication, with a view to preventing disturbance or radio interference from affecting other systems, stringent standards are assigned to adjacent channel leakage power so that disturbance interfering adjacent channels may be suppressed to a minimum.

However, in the modulation method described as above, the multiplexing interval in the TMUX is the frequency interval (channel interval) in frequency multiplexing. Besides, a higher harmonic component of the zero interpolation output signal inputted to the TMUX is also generated at intervals of multiplexing in the TMUX. Accordingly, as the multiplexing interval (channel interval) approaches the band width of individual signals, the polyphase filter of the TMUX is required to have a sharp characteristic capable of sufficiently removing adjacent channel signals.

FIGS. 8A and 8B are diagrams for explaining the relation between the channel interval and the filter characteristic, where abscissa represents frequency and ordinate represents signal level. Illustrated in FIG. 8A is a case in which the channel interval is wider than the signal band width and a filter of slow characteristics may suffice. On the other hand, FIG. 8B illustrates a case in which the channel interval is narrower than the signal band width and a filter is required to have a sharp characteristic.

Further, since the transmission band limiting characteristic must be realized by using a total characteristic of (1) the characteristic of the interpolation filter adapted to convert the sampling frequency of the input base-band signal symbol frequency sequence into the sampling frequency of TMUX process sequence and (2) the characteristic of the TMUX polyphase filter, it is difficult to realize the filter characteristic. FIG. 9 is a diagram usual to explain aliasing distortion of its own signal when the polyphase filter has an ideal filter characteristic and the interpolation filter has a very slow decaying characteristic (shown by solid line). As shown in FIG. 9, when the interpolation filter is provided with the transmission band limit characteristic (dotted line), since the frequency interval is narrow, the polyphase filter is required to have the ideal filter characteristic for the purpose of performing signal separation without impairing the transmission band limiting characteristic. Conversely, in case the polyphase filter is made to have the transmission band limiting characteristic, the interpolation filter is required to have a very slow decaying characteristic in order not to impair the transmission band limiting characteristic. However, this leads to a disadvantage that at the time that the zero interpolation is carried out, the characteristic is distorted by an aliasing signal of its own. To be able to obtain the transmission band limiting characteristic using a total characteristic of the interpolation filter characteristic and the TMUX polyphase filter, it is required to share the filter characteristic between the filters, which is difficult to attain.

Especially, because of the generation of distortion due to the aliasing signal, it is impossible to deal with the multiplexing mode such as the M16QAM mode of digital MCA (RCR-STD32) in which the band width of each signal is wider than the channel interval and the individual signals cannot be separated completely.

As described above, in case the TMUX is utilized for multi-carrier modulation, there arises the problem that as the multiplexing interval (channel interval) approaches the signal band width, the polyphase filter of TMUX must have a sharp characteristic for the sake of sufficiently eliminating the close channel signals.

In addition, the transmission band limit characteristic must be realized with a total characteristic of (1) the interpolation filter characteristic for conversion of the sampling frequency of the input base-band signal symbol frequency sequence into the TMUX process sequence sampling frequency and (2) the characteristic of the TMUX polyphase filter, raising a problem that the filter characteristic is difficult to achieve.

Further, in the multiplexing mode such as M16QAM mode of digital MCA (RCR-STD32) in which the band width of each signal is wider than the channel interval and the individual signals are not separated completely, there arises a disadvantage that distortion due to aliasing signal cannot be dealt with.

The present invention intends to eliminate the drawbacks as above and it is an object of the present invention to provide a multi-modulation wave multiplexing apparatus which can use a polyphase filter having a slow decaying characteristic without impairing the transmission band characteristic even when the multiplexing interval is close to the signal band width.

According to the present invention, the fundamental idea to accomplish the above object resides in that a multiplexing signal is treated as a synthesis of a plurality of multiplexing signals which are separated by a wider interval than the multiplexing frequency interval, so that for example, each of the channel signals which are frequency-multiplexed continuously at a predetermined channel interval is treated as a synthetic signal of two or more kinds of multiplex signals which are frequency-multiplexed at a channel interval twice or more the width of the predetermined channel interval, and the individual multiplex signals are multiplex-synthesized by means of a plurality of TMUX's having smaller multiplexing channel number.

Through this, the multi-modulation wave multiplexing can be realized without impairing the transmission band characteristic by using a polyphase filter having a slow decaying characteristic as the polyphase filter required for the TMUX even when the multiplexing interval approaches the signal band width.

According to an aspect of the present invention, a multi-carrier modulation apparatus for converting M modulation signals into a frequency-division multiplex signal having M carrier modulation signals, comprises a plurality of transmultiplexers receiving the M modulation signals, sharing the M modulation signals there among, and an adder for adding output signals of the transmultiplexers and delivering the frequency-division multiplex signal, wherein modulation signals of adjacent channels are inputted to different transmultiplexers and M is 2 or a positive integer more than 2.

In an embodiment, the multi-carrier modulation apparatus further comprises M interpolation filters receiving M input signals and delivering M matched signals each having a sampling frequency which is matched to a processing frequency sequence of the transmultiplexers, M frequency shifters delivering shifted signals in which frequency positions of the matched signals are shifted to frequency positions extracted by the transmultiplexers, and zero interpolators delivering M conversion signals which are each converted into the processing signal sequence of the sampling frequency of the transmultiplexers, wherein the M conversion signals are inputted, as the modulation signals, to the plurality of transmultiplexers.

In an embodiment, each of the transmultiplexers includes an IDFT having N input terminals and N output terminals, N being determined by a power of 2 and being larger than the number of received input modulation signals, a plurality of polyphase filters each connected to one of the IDFT output terminals, phase shifters each connected to one of output terminals of the polyphase filters, and delay units each connected to one of output terminals of the phase shifters, wherein the polyphase filters are constructed of band-pass filters each having the same pass-band width ($f_B$) and having center frequencies which are separated from each other by a predetermined frequency interval.

According to another aspect of the invention, a multi-carrier modulation apparatus for converting M modulation signals into a frequency-division multiplexing signal carrying corresponding M carrier modulation signals which are frequency-division multiplexed at a predetermined channel interval, comprises a plurality of transmultiplexers operative at a channel interval which is twice or more the predetermined channel interval, and an adder for adding outputs of the plurality of transmultiplexers, wherein the M modulation signals are distributed or shared among the plurality of transmultiplexers so as to be inputted thereto.

In one embodiment, the multi-carrier modulation apparatus has a D/A converter receiving an output of the adder, a radio-frequency processing unit receiving an output of the converter and an antenna connected to the radio-frequency processing unit to form a transmitter.

DESCRIPTION OF THE EMBODIMENTS

The invention will now be described by way of example with reference to the accompanying drawings.

Figure 1:
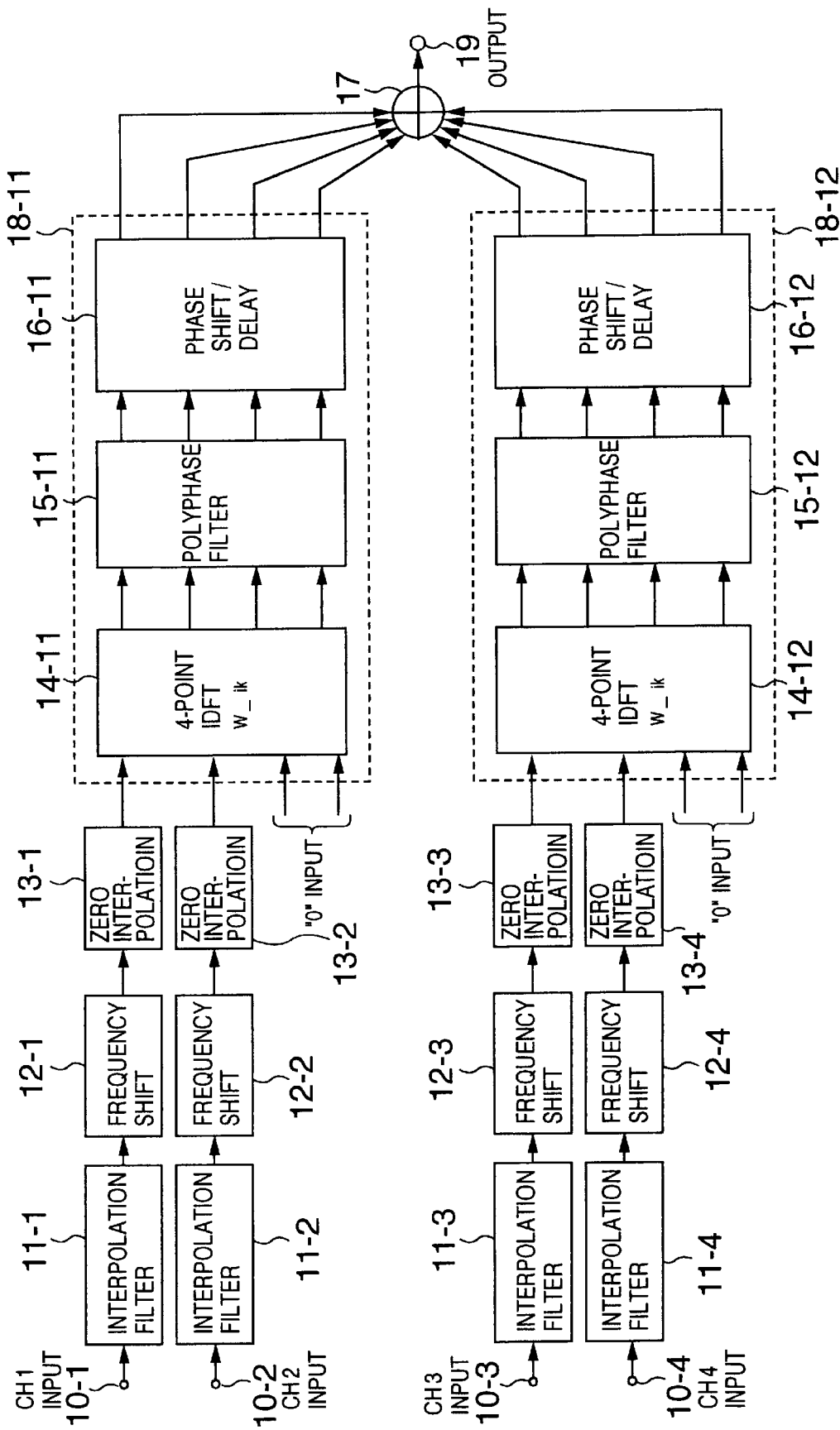
FIG. 1 is a block diagram showing a construction of a multi-carrier modulation apparatus according to an embodiment of the invention.
Figure 2:
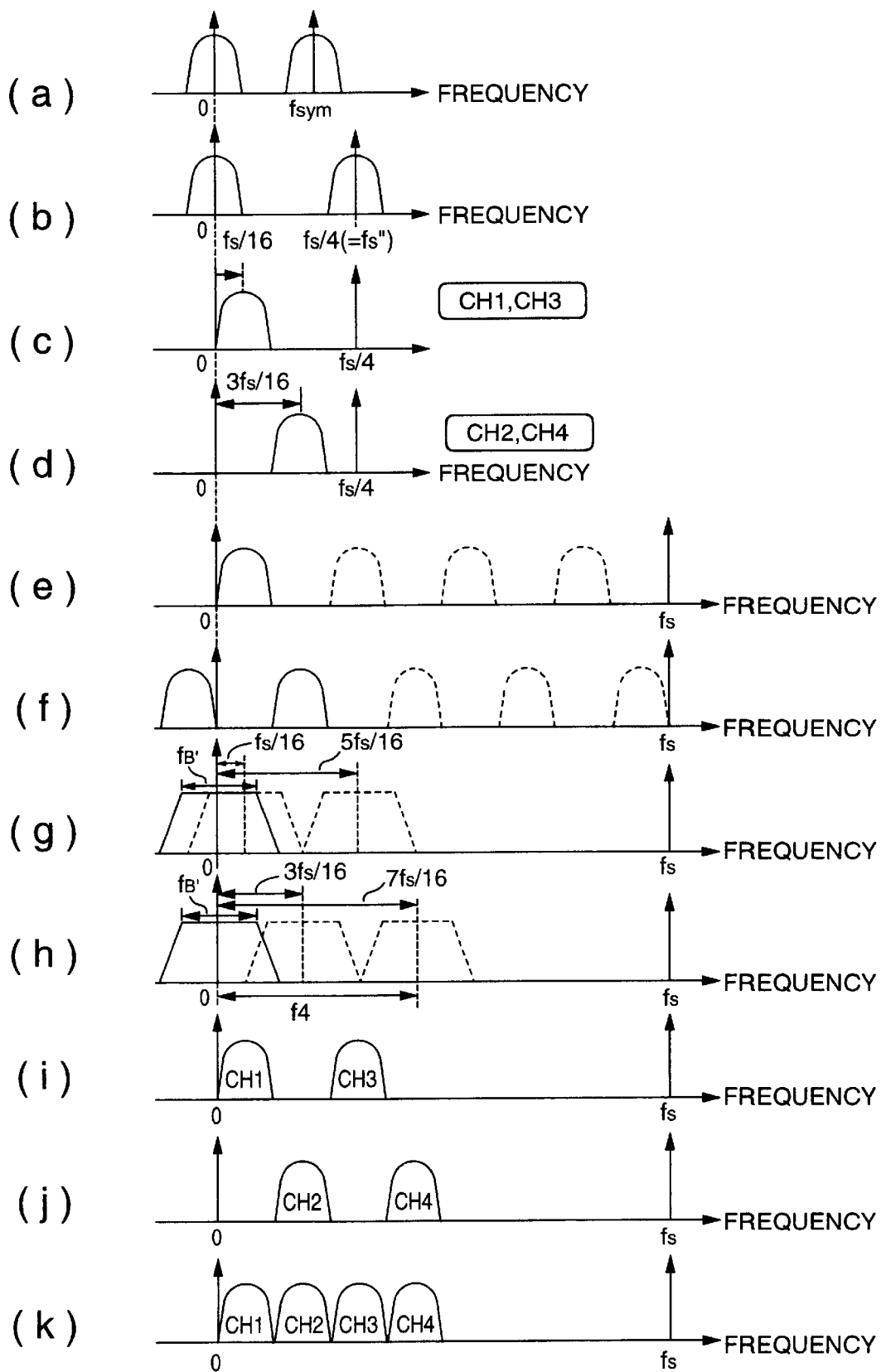
FIG. 2 is a spectrum diagram useful to explain an example of a frequency multiplexing method of the invention in the apparatus of FIG. 1.
Figure 3:
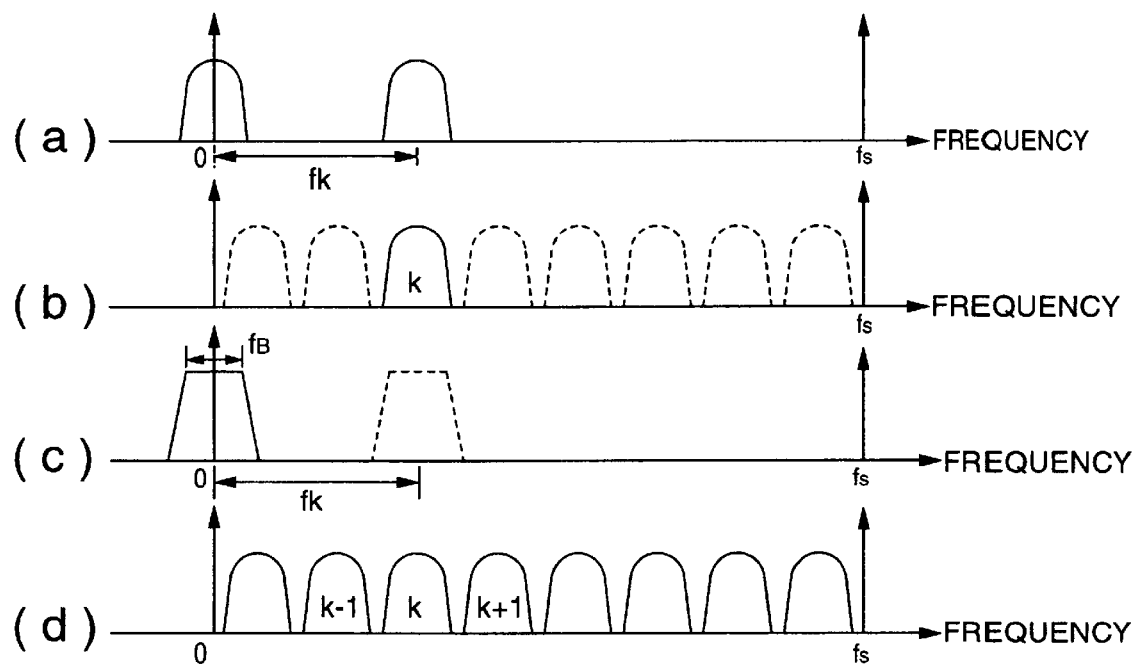
FIG. 3 is a spectrum diagram useful to explain the operational principle of TMUX and filter bank along its procedure.
Figure 4:
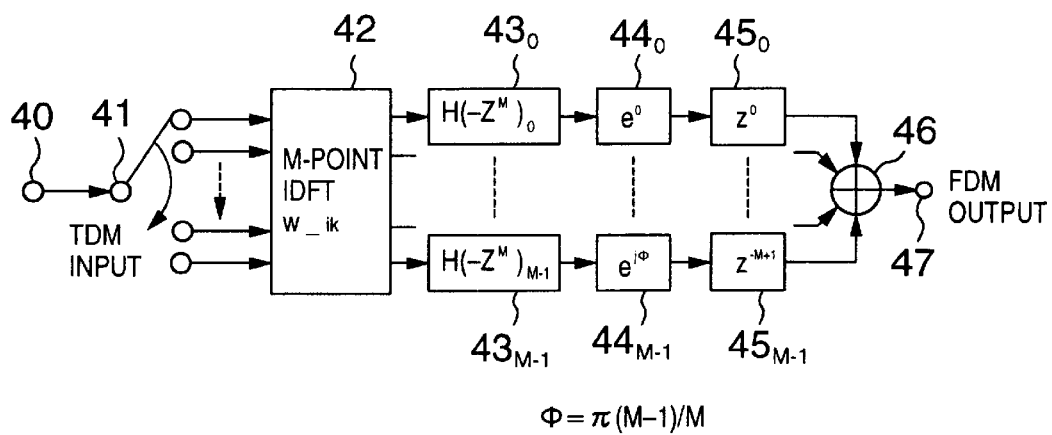
FIG. 4 is a block diagram showing the construction of a prior art TMUX for realization of the TDM-FDM conversion.
Figure 6:
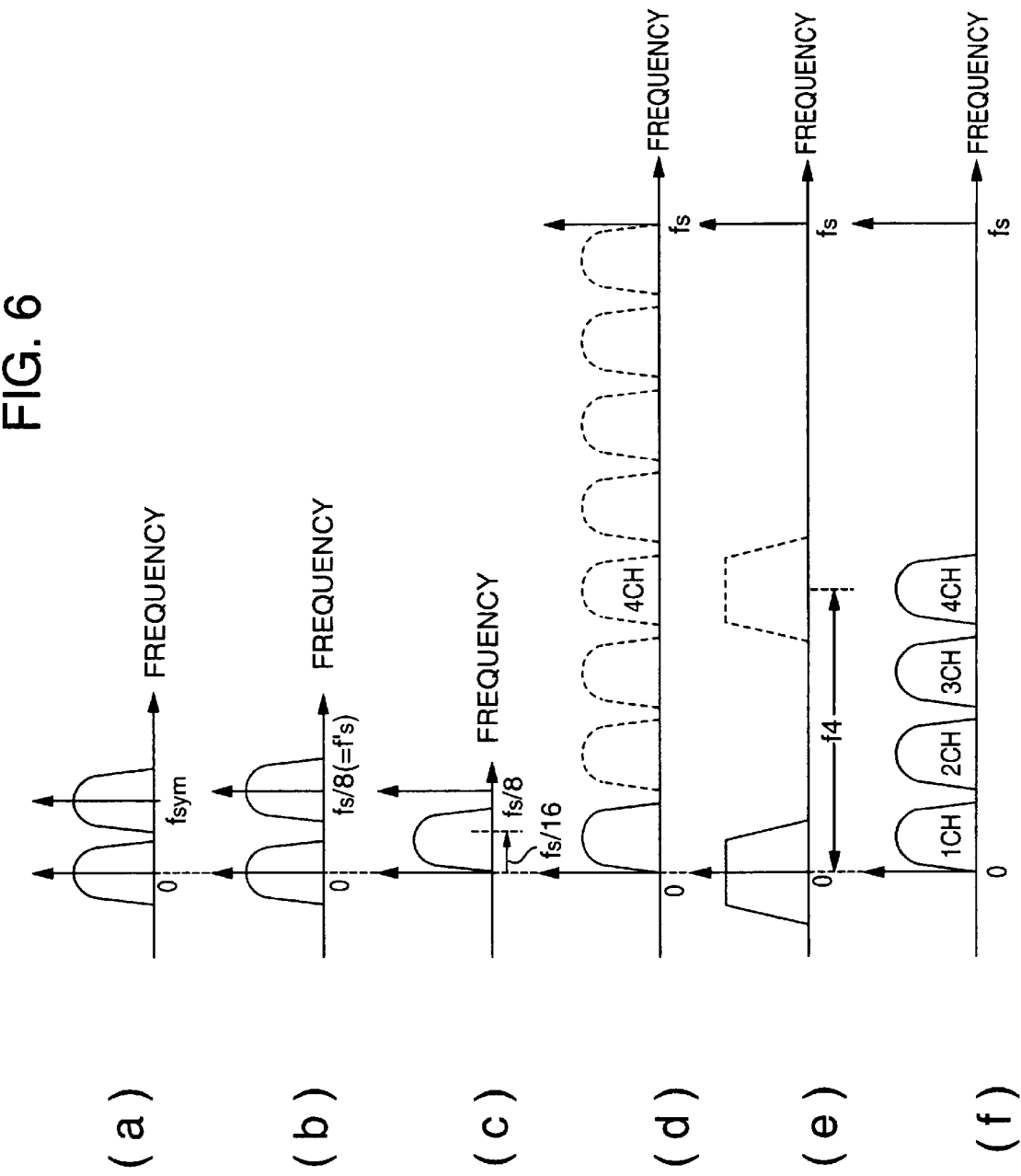
FIG. 6 is a spectrum diagram useful to explain a frequency multiplexing method in the apparatus of FIG. 5.
Figure 7:
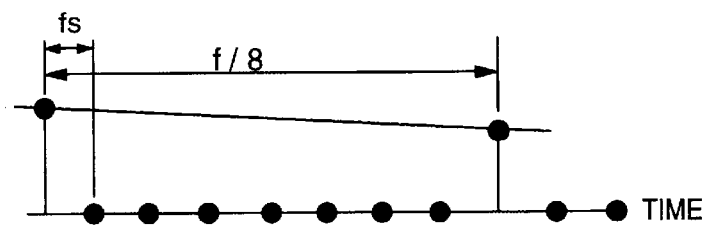
FIG. 7 is a diagram useful to explain the principle of zero interpolation.
Figure 8A:
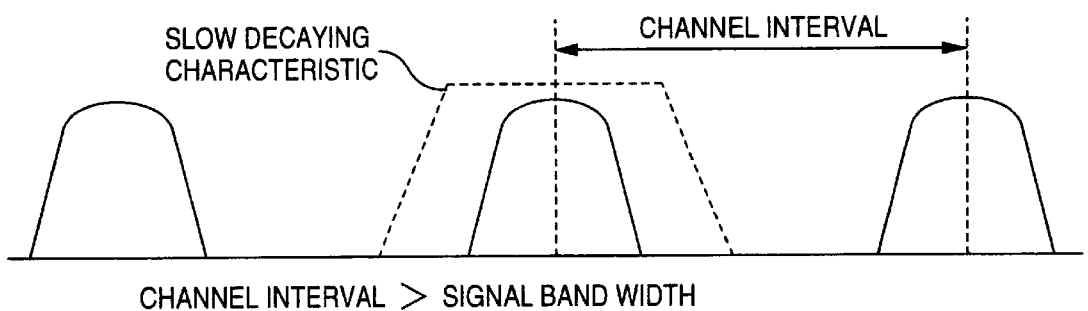
FIGS. 8A and 8B are spectrum diagrams useful to explain problems encountered in the apparatus of FIG. 5.
Figure 8B:
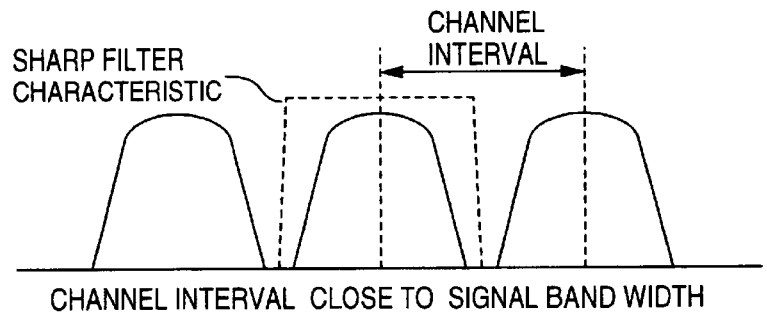
Figure 9:
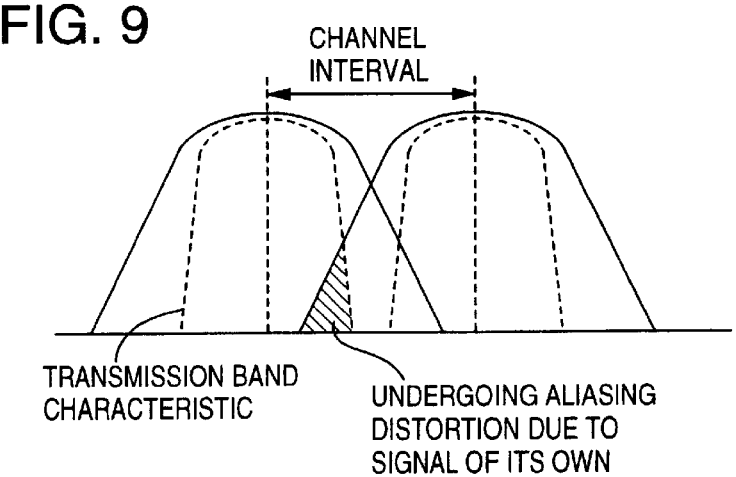
FIG. 9 is a spectrum diagram useful to explain other problems encountered in the apparatus of FIG. 5.

Referring first to FIGS. 1 and 2, a multi-carrier modulation apparatus according to an embodiment of the present invention will be described. In the present embodiment, the multi-carrier modulation performed in the TMUX processing of 8-channel multiplexing as explained in the background of the invention is practiced by multi-carrier modulation using two 4-channel multiplexing TMUX's to which the present invention is applied. FIG. 2 is a spectrum diagram for explaining the operational procedure of the 4-channel multiplexing channel number (CH1, CH2, CH3, CH4) multi-carrier modulation using two TMUX's of 4-point inputs. In FIG. 2, abscissa represents frequency, ordinate represents signal level, $f_S$ represents sampling frequency, $f_{sym}$ represents symbol frequency sequence of input complex base-band signal sampling frequency, and $f_B'$ represents filter pass-band width. $f_B'$ is set to be wider than $f_B$ shown in FIG. 3. Note that the scale of the abscissas of FIG. 2 is not drawn to coinside with that of FIGS. 3 and 6 due to drafting, although $f_s$ is the same among FIGS. 2, 3 and 6. The 4-channel multiplexing multi-carrier modulation apparatus of the present embodiment using the two 4-point input TMUX's is constructed as shown in block form in FIG. 1. The apparatus shown in FIG. 1 has input terminals 10-1, 10-2, 10-3 and 10-4, interpolation filters 11-1, 11-2, 11-3 and 11-4, frequency shifters 12-1, 12-2, 12-3 and 12-4, zero interpolators 13-1, 13-2, 13-3 and 13-4, 4-point IDFT units 14-11 and 14-12, polyphase filters 15-11 and 15-12, phase shift/delay circuits 16-11 and 16-12, an adder 17 and an output terminal 19. The 4-point IDFT unit 14-11, polyphase filter 15-11 and phase shift/delay circuit 16-11 constitute one TMUXunit 18-11 and the 4-input IDFT unit 14-12, polyphase filter 15-12 and phase shift/delay circuit 16-12 constitute the other TMUX 18-12.

The input terminal 10-1 for channel 1 (CH1) is connected to the interpolation filter 11-1 which in turn is connected to the frequency shifter 12-1. The frequency shifter 12-1 is connected to the zero interpolator 13-1 which in turn is connected to the 4-point IDFT unit 14-11. The input terminal 10-2 for channel 3 (CH3) is connected to the interpolation filter 11-2 which in turn is connected to the frequency shifter 12-2. The frequency shifter 12-2 is connected to the zero interpolator 13-2 which in turn is connected to the 4-point IDFT unit 14-11. Respective output terminals of the 4-point IDFT unit 14-11 are connected to the polyphase filter 15-11, with respective output terminals of the polyphase filter 15-11 connected to the phase shift/delay circuit 16-11. Respective output terminals of the phase shift/delay circuit 16-11 are connected to the adder 17. The remaining input terminals of the 4-point IDFT unit 14-11 are applied with "0" level. Similarly, in other channels 3 and 4 (CH2 and CH4), the input terminals 10-3 and 10-4 are connected to the 4-point IDFT unit 14-12 through the interpolation filters 11-3 and 11-4, frequency shifters 12-3 and 12-4 and zero interpolators 13-3 and 13-4. Respective output terminals of the 4-point IDFT unit 14-12 are connected to the polyphase filter 15-12 and respective output terminals of the polyphase filter 15-12 are connected to the phase shift/delay circuit 16-12. Respective output terminals of the phase shift/delay circuit 16-12 are connected to the adder 17. The remaining input terminals of the 4-point IDFT unit 14-12 are applied with "0" level. The adder 17 is connected to the output terminal 19.

In FIGS. 1 and 2, complex base-band signals of the respective channels are inputted to the interpolation filters 11-1, 11-2, 11-3 and 11-4 through the input terminals 10-1, 10-2, 10-3 and 10-4 provided for respective channels so as to be converted from input base-band signal sampling frequency sequence into TMUX sampling frequency sequence.

A time-variant coefficient filter similar to that disclosed in U.S. Pat. No. 5,473,280 may be used as the interpolation filter. Through this process, the sampling frequency $f_{sym}$ (symbol frequency sequence) of the complex base-band signal as shown at (a) in FIG. 2 is converted into a frequency $f_S''$ ($f_S''=f_S/4$) of the TMUX process sequence as shown at (b) in FIG. 2. Subsequently, the frequency is shifted by means of the frequency shifters 12-1, 12-2, 12-3 and 12-4. Frequency shift in CH1 and CH3 is depicted at (c) in FIG. 2 and that in CH2 and CH4 is depicted at (d) in FIG. 2.

The shift amounts in the frequency shifters 12-1, 12-2, 12-3 and 12-4 are as follows:

The shift amount of CH1 input by the frequency shifter 12-1 is $+f_S/16$ (at (c) in FIG. 2);

The shift amount of CH2 input by the frequency shifter 12-3 is $+3f_S/16$ (at (d) in FIG. 2);

The shift amount of CH3 input by the frequency shifter 12-2 is $+f_S/16$ (at (c) in FIG. 2); and The shift amount of CH4 input by the frequency shifter 12-4 is $+3f_S/16$ (at (d) in FIG. 2).

Figure 10:
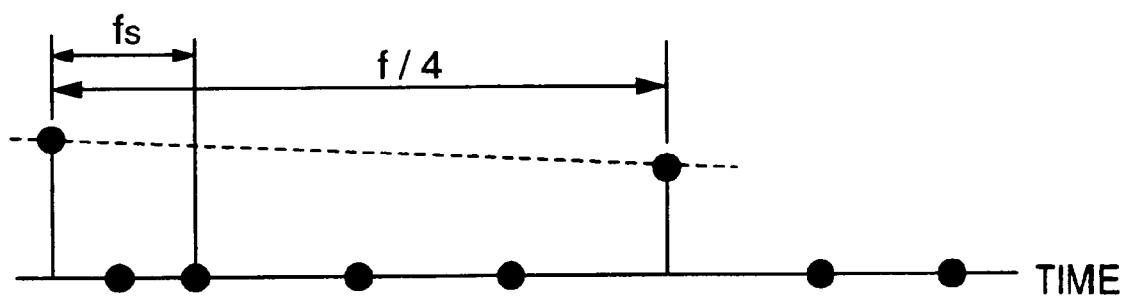
FIG. 10 is a diagram useful to explain the principle of zero interpolation in case of the sampling frequency being $f_s/4$.

These signals applied with the frequency shift process are converted into a process sequence of sampling frequency $f_S$ by means of the zero interpolators 13-1, 13-2, 13-3 and 13-4. In this conversion process, the outputs of the preceding stages of frequency shifters 12-1, 12-2, 12-3 and 12-4 are delivered at only the period of frequency $f_S/4$ and "0"s are delivered at the remaining 3 points shown in FIG. 10. Through this operation, higher harmonic components are generated at intervals of frequency $f_S/4$ as shown at (e) and (f) in FIG. 2. In FIG. 10, abscissa represents time and ordinate represents amplitude level of signal.

Then, the TMUX 18-11 for multiplexing the CH1 and CH3 signals and the TMUX 18-12 for multiplexing the CH2 and CH4 signals are used, so that necessary bands in the frequency spectra at (e) and (f) in FIG. 2 are extracted as follows:

For CH1, by means of a filter in which the original filter is $+f_S/16$ shifted (at (g) in FIG. 2);

For CH2, by means of a filter in which the original filter is $+3f_S/16$ shifted (at (h) in FIG. 2);

For CH3, by means of a filter in which the original filter is $+5f_S/16$ shifted (at (g) in FIG. 2); and For CH4, by means of a filter in which the original filter is $+7f_S/16$ shifted (at (h) in FIG. 2), in order to multiplex the two channel signals (at (i) and (j) in FIG. 2).

The above two TMUX outputs are added by means of the adder 17 to obtain a 4-channel frequency multiplexing output.

Since, in the k-th filter $H_K(Z)$ of the 4-channel multiplexing TMUX 18-11, $H_0(Z)$ of the original filter having the same frequency characteristic is frequency-shifted by (k/4+1/16), equations (1), (2) and (4) are respectively reduced to, $$\exp(j2\pi(f-kf_s/4-f_s/16)f_s) = z\exp(-j2\pi(k/4+1/16)) \quad (9)$$
$$= z\exp(-j2\pi(k+1/4)/4)$$
$$= zW^k \exp(-j\pi/8)$$

where, $W=\exp(-j2\pi/4)$ $$H_k'(z)=H_0'(zW^k \exp(-j\pi/8)) \quad (10)$$

$$H_k'(z) = \sum_{i=0}^{3} H_k'(z^4)_i z^{-i} \quad (11)$$
$$= \sum_{i=0}^{3} H_0'(-z^4)z^{-i}W_{-ik}\exp(j\pi i/8)$$

where $W_{-ik}=(W)^{-ik}=\exp(j2\pi ik/4)$

Since the k-th filter $H_K(Z)$ of the 4-channel multiplexing TMUX 18-12 is obtained by frequency-shifting the original filter $H_0(Z)$ having the same frequency characteristic by (k/4+3/16), equations (1), (2) and (4) are reduced to $$\exp(j2\pi(f-kf_s/4-3f_s/16)/f_s) = z\exp(-j2\pi(k/4+3/16)) \quad (12)$$
$$= z\exp(-j2\pi(k+3/4)/4)$$
$$= zW^k\exp(-j3\pi/8)$$

where, $W=\exp(-j2\pi/4)$ $$H_k'(z)=H_0'(zW^k \exp(-j3\pi/8)) \quad (13)$$

$$H_k'(z) = \sum_{i=0}^{3} H_k'(z^4)_i z^{-i} \quad (14)$$
$$= \sum_{i=0}^{3} H_0'(jz^4)z^{-i}W_{-ik}\exp(j3\pi i/8)$$

wherein, $W_{-ik}=(W)^{-ik}=\exp(j2\pi ik/4)$

In FIG. 1, each of the 4-point IDFT units 14-11 and 14-12 is applied with the two input signals and the two zero level signals. In this manner, the zero level signals can be positioned at portions adjacent to the input signals in order for the next stage of polyphase filter to have a slow characteristic. Accordingly, half or more the input terminals of the IDFT unit must be applied with zero level signals. For example, the number of zero level input signals must be one in case of a 2-point input IDFT unit, the number of zero level input signals must be two or more in case of a 4-point input IDFT unit, the number of zero level input signals must be four or more in case of an 8-point input IDFT unit and the number of zero level input signals must be eight or more in case of a 16-point input IDFT unit.

Figure 5:
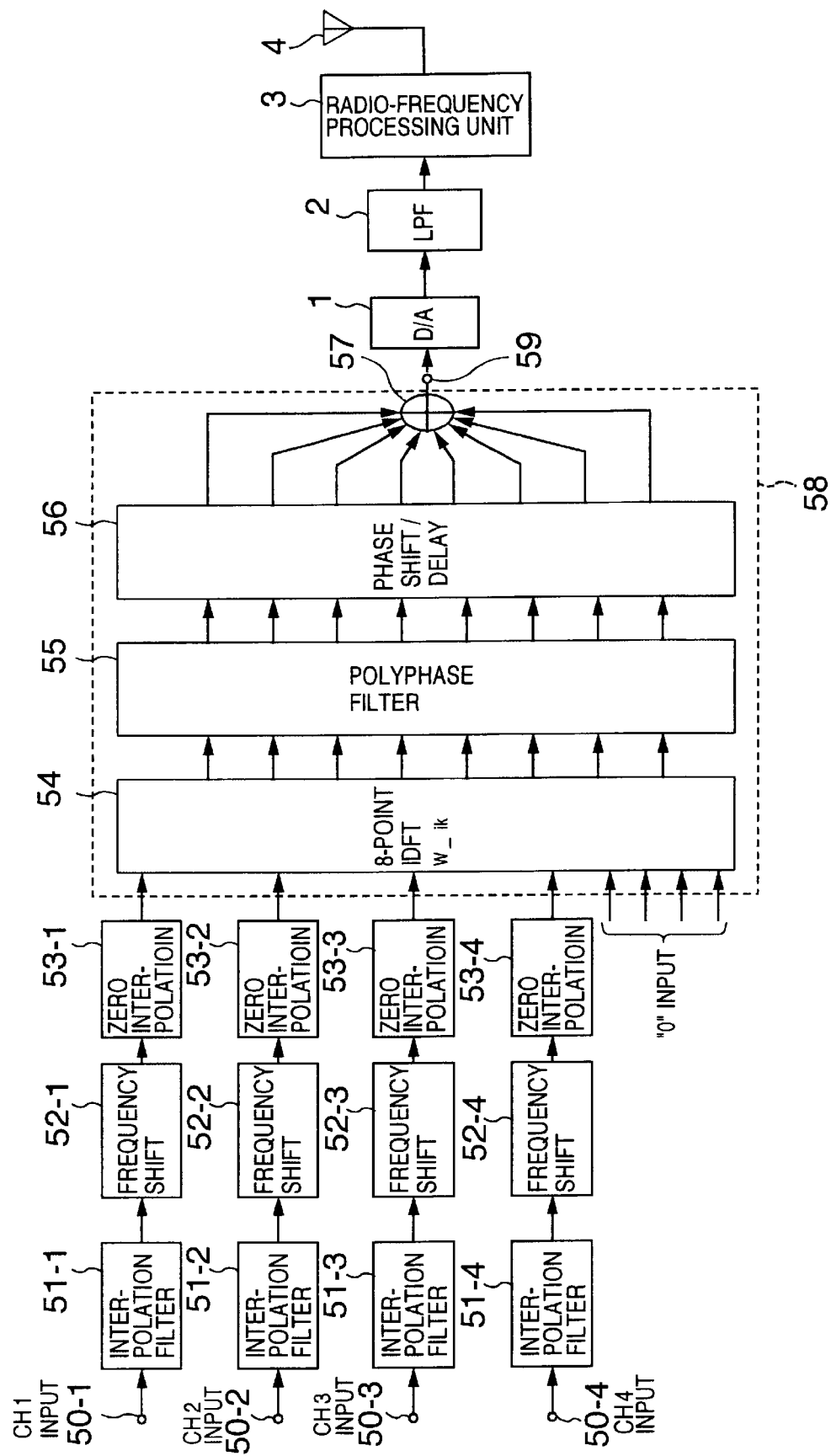
FIG. 5 is a block diagram showing the construction of a multi-carrier modulation apparatus contrived and studied by the present inventors in order to realize a 4-channel multiplexing multi-carrier modulation method by using an 8-point input TMUX.

In the foregoing embodiment, the 8-channel multiplexing TMUX process is replaced with the two 4-channel multiplexing TMUX processes, but, obviously, it may be divided into three or more TMUX processes and the multiplexing number is not always be limited to eight. Obviously, like the apparatus of FIG. 5, the adder 17 may be followed by the connection of the D/A converter 1, LPF 2, radio-frequency processor 3 and antenna 4 to form a transmitter.

Figure 11:
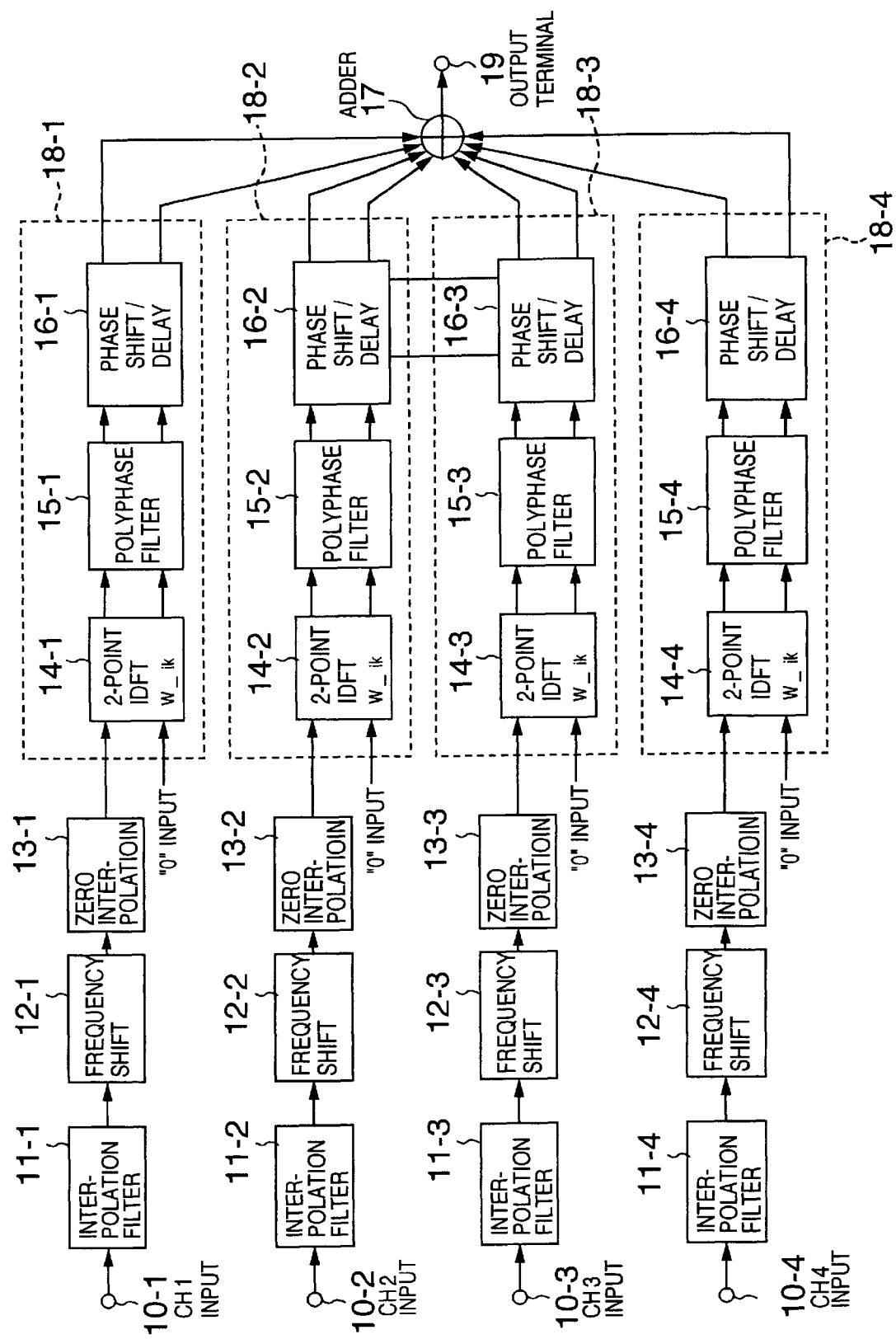
FIG. 11 is a block diagram showing the construction of a multi-carrier modulation apparatus according to another embodiment of the invention.

Referring now to FIG. 11, there is illustrated, in block form, a multi-carrier modulation apparatus according to another embodiment of the present invention. In FIG. 11, M is 4 to give an example where four 2-channel multiplexing TMUX are used for modulation and components functioning similarly to those in FIG. 1 are designated identical reference numerals. The apparatus is made up of 2-point IDFT units 14-1, 14-2, 14-3 and 14-4, polyphase filters 15-1, 15-2, 15-3 and 15-4 and phase shift/delay circuits 16-1, 16-2, 16-3 and 16-4 to form TMUX units 18-1, 18-2, 18-3 and 18-4, respectively. In FIG. 11, the order of channels to be connected to input terminals 10-1, 10-2, 10-3 and 10-4 differs from that in the embodiment of FIG. 1 in such a way that channel signals are inputted in successive order. Each 2-point IDFT unit has one input applied with a zero interpolated signal and the other input applied with zero level.

Obviously, the modulation apparatus of FIG. 1 can be further extended by further increasing the multiplexing number.

According to the foregoing embodiments, the wide frequency interval can be ensured when performing multiplexing with the TMUX and therefore, the characteristic of the polyphase filter can be set without impairing the transmission band limiting characteristic, thus making design of the individual filters easy.

Further, even in the multiplexing scheme in which the band width of each signal is wider than the channel interval and so the individual signals are not separated completely, frequencies can be multiplexed without causing distortion due to aliasing signals.

We claim:

1. A multi-carrier modulation apparatus for converting M modulation signals into a frequency-division multiplexed signal having M carrier modulation signals, wherein M is 2 or a positive integer more than 2, comprising:

a plurality of transmultiplexers, to which said M modulation signals are applied;

an adder for adding output signals of said transmultiplexers and delivering said frequency-division multiplexed signal, wherein said M modulation signals comprise M channels and modulation signals on adjacent channels are input to different ones of said transmultiplexers;

M interpolation filters receiving M input signals and delivering M matched signals each having a sampling frequency which is matched to a processing frequency sequence of said transmultiplexers;

M frequency shifters delivering shifted signals in which frequency positions of the matched signals are shifted to frequency positions extracted by said transmultiplexers; and zero interpolators delivering M conversion signals which are each converted into the processing frequency sequence of the sampling frequency of said transmultiplexers, wherein said M conversion signals are input, as said M modulation signals, to said plurality of transmultiplexers.

2. A multi-carrier modulation apparatus according to claim 1, wherein each of said transmultiplexers comprises:

an Inverse Discrete Fourier Transform (IDFT) unit having N input terminals and N output terminals, N being determined by a power of 2 which is larger than the number of received input modulation signals;

a plurality of polyphase filters each connected to one of the IDFT unit output terminals;

a plurality of phase shifters each connected to one of output terminals of the polyphase filters; and a plurality of delay units each connected to one of output terminals of the phase shifters, wherein the polyphase filters include band-pass filters each having the same pass-band width and having center frequencies which are separated from each other by a predetermined frequency interval.

3. A multi-carrier modulation apparatus according to claim 2, wherein half or more of said N input terminals of each transmultiplexer are applied with a zero level signal.

4. A multi-carrier modulation apparatus for converting M modulation signals into a frequency-division multiplexed signal including corresponding M carrier modulation signals which are frequency-division multiplexed at a predetermined channel interval, wherein M is 2 or a positive integer more than 2, comprising:

a plurality of transmultiplexers operative at a channel interval which is twice or more than said predetermined channel interval;

an adder for adding outputs of said plurality of transmultiplexers, wherein said M modulation signals are distributed or shared among said plurality of transmultiplexers so as to be input to associated transmultiplexers;

M interpolation filters receiving M input signals and delivering M matched signals each having a sampling frequency which is matched to a processing frequency sequence of said transmultiplexers;

M frequency shifters delivering shifted signals in which frequency positions of the matched signals are shifted to frequency positions extracted by said transmultiplexers; and zero interpolators delivering M conversion signals which are each converted into the processing frequency sequence of the sampling frequency of said transmultiplexers, wherein said M conversion signals are input, as said M modulation signals, to said plurality of transmultiplexers.

5. A multi-carrier modulation apparatus according to claim 4, wherein each of said transmultiplexers comprises:

an Inverse Discrete Fourier Transform (IDFT) unit having N input terminals and N output terminals, N being determined by a power of 2 which is larger than the number of received input modulation signals;

a plurality of polyphase filters each connected to one of the IDFT unit output terminals;

a plurality of phase shifters one connected to each of output terminals of the polyphase filters; and a plurality of delay units each connected to one of output terminals of the phase shifters, wherein the polyphase filters include band-pass filters each having the same pass-band width and having center frequencies which are separated from each other by a predetermined frequency interval.

6. A multi-carrier modulation apparatus according to claim 5, wherein half or more of said N input terminals of each transmultiplexer are applied with a zero level signal.

7. A transmitter for converting M modulation signals into a frequency-division multiplexed signal and transmitting said frequency-division multiplexed signal, comprising:

a multi-carrier modulator for converting said M modulation signals into said frequency-division multiplexed signal carrying M carrier modulation signals;

a Digital to Analog (D/A) converter receiving an output of said multi-carrier modulator;

a high-frequency unit receiving an output of said D/A converter;

an antenna connected to an output terminal of said high-frequency unit, wherein said multi-carrier modulator includes:

a plurality of transmultiplexers applied with said M modulation signals, said plurality of transmultiplexers receiving said M modulation signals such that modulation signals of adjacent channels are input to different ones of said transmultiplexers, and an adder for adding output signals of said plurality of transmultiplexers;

M interpolation filters receiving M input signals and delivering M matched signals each having a sampling frequency which is matched to a processing frequency sequence of said transmultiplexers;

M frequency shifters delivering shifted signals in which frequency positions of the matching signals are shifted to frequency positions extracted by said transmultiplexers; and zero interpolators delivering M conversion signals which are each converted into the processing frequency sequence of the sampling frequency of said transmultiplexers, wherein said M conversion signals are input, as said M modulation signals, to said plurality of transmultiplexers.

8. A transmitter for converting M modulation signals into a frequency-division multiplexed signal and transmitting said frequency-division multiplexed signal, comprising:

a multi-carrier modulator receiving said M modulation signals and delivering said frequency-division multiplexed signal carrying corresponding M carrier wave modulation signals which are frequency-division multiplexed at a predetermined channel interval;

a Digital to Analog (D/A) converter receiving an output of said multi-carrier modulator;

a high-frequency processing unit receiving an output of said D/A converter;

an antenna connected to an output terminal of said high-frequency processing unit, wherein said multi-carrier modulator includes:

a plurality of transmultiplexers operative at a channel interval which is twice or more than said predetermined channel interval, and an adder for adding outputs of said plurality of transmultiplexers, wherein said M modulation signals are shared among said plurality of transmultiplexers so as to be input to associated transmultiplexers;

M interpolation filters receiving M input signals and delivering M matched signals each having a sampling frequency which is matched to a processing frequency sequence of said transmultiplexers;

M frequency shifters delivering shifted signals in which frequency positions of the matched signals are shifted to frequency positions extracted by said transmultiplexers; and zero interpolators delivering M conversion signals which are each converted into the processing frequency sequence of the sampling frequency of said transmultiplexers, wherein said M conversion signals are input, as said M modulation signals, to said plurality of transmultiplexers.

* * * * *